(12) United States Patent
Greig et al.

(10) Patent No.: US 6,294,043 B1
(45) Date of Patent: *Sep. 25, 2001

(54) METHOD OF MANUFACTURE OF A STRUCTURE AND A STRUCTURAL MEMBER FOR USE IN THE METHOD

(75) Inventors: Daryl John Greig; Kenneth John Sears, both of Norfolk (GB)

(73) Assignee: Lotus Car Limited, Norfolk (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/913,986

(22) PCT Filed: Mar. 27, 1996

(86) PCT No.: PCT/GB96/00741

§ 371 Date: Jan. 6, 1998

§ 102(e) Date: Jan. 6, 1998

(87) PCT Pub. No.: WO96/32594

PCT Pub. Date: Oct. 17, 1996

(30) Foreign Application Priority Data

Mar. 27, 1995 (GB) ................................................ 9506181

(51) Int. Cl.[7] .................................................... B32B 7/12
(52) U.S. Cl. ................................................ 156/290; 156/292
(58) Field of Search ................................... 156/290, 291, 156/292

(56) References Cited

U.S. PATENT DOCUMENTS

| | | | |
|---|---|---|---|
| 3,192,671 | * 7/1965 | Smith | 52/434 |
| 4,498,264 | * 2/1985 | McCafferty et al. | 52/281 |
| 5,209,541 | 5/1993 | Janotik | 296/29 |
| 5,232,962 | 8/1993 | Dershem et al. | 523/442 |
| 5,653,522 | * 8/1997 | Loucks | 353/122 |

FOREIGN PATENT DOCUMENTS

| | | |
|---|---|---|
| B-1268439 | 5/1968 | (DE) . |
| 3811427 A | 10/1989 | (DE) . |
| 4202391 A1 | 8/1993 | (DE) . |
| 2149719 A | 6/1985 | (GB) . |
| 63312382 A | 12/1988 | (JP) . |

OTHER PUBLICATIONS

Translation of German Patent No. DE–B–1268439.
Letter dated Sep. 25, 1996 from Tinley Oast Research Ltd. to Lotus Cars Ltd. (with enclosure).
Letter dated Jun. 9, 1997 from A.W. Pluckrose of Boult Wade Tennant to Professor Paul Murray of Tinley Oast Research Ltd.
Response letter from Professor Paul Murray of Tinley Oast Research Ltd. to A.W. Pluckrose of Boult Wade Tennnant dated Aug. 8, 1997 enclosing two brochures entitled "Total Training for Airline Operations" and "Unrivalled for Pilot Training".
International Search Report dated Jul. 22, 1996.

* cited by examiner

*Primary Examiner*—Michael W. Ball
*Assistant Examiner*—Barbara J. Musser
(74) *Attorney, Agent, or Firm*—Fulwider Patton Lee & Utecht, LLP

(57) ABSTRACT

The present invention relates to a method of manufacture of a structure which comprises a plurality of structural members bonded together, the method comprising the steps of extruding a first structural member with a chosen cross section, and joining the first structural member to a second structural member by bonding with an adhesive, wherein the depth of the adhesive between the structural members is chosen so as to enhance the performance of the adhesive bond. The present invention also provides a method of manufacture of a structure wherein the first structural member is provided on a first surface with a plurality of spaced-apart exterior ribs which abut an adjacent surface on the second structural member and which define between them a gap for receiving adhesive, whereby the ribs define a chosen depth of adhesive in order to optimize the bond between the first and second structural members.

24 Claims, 1 Drawing Sheet

METHOD OF MANUFACTURE OF A STRUCTURE AND A STRUCTURAL MEMBER FOR USE IN THE METHOD

The present invention relates to a method of manufacture of a structure and to a structural member for use in the method. The invention particularly relates to the manufacture of a space frame structure for an automobile, but should not be considered limited to such an application.

Recently there has been interest in reducing the weight of automobiles in order to improve fuel economy and performance. There has consequently been a move to use aluminium in place of steel in the manufacture of automobiles. Whilst aluminium has many advantages over steel, in particular in terms of weight saving, it is difficult to form a space frame for a vehicle from aluminium since welding of aluminium is difficult.

U.S. Pat. No. 5,209,541 discloses a method of manufacture of a space frame for an automobile from aluminium structural members. The method involves the bonding of the aluminium structural members together with a suitable bonding material such as an acrylic adhesive. The method requires that two structural members to be joined together are each provided with a shaped channel and that an interconnecting member is provided to be inserted into both the channels of the two aluminium members, with the interconnecting member being secured there by adhesive. The method involves complications since the structural members must be machined to give a specific cross section in the areas of joints and also since interconnectors must be used.

DE-A-3525830 shows how a bootlid for an automobile can be made by the bonding together of two metal sheets which are shaped with grooves which provide a gap for adhesive.

DE-A-3811427 shows how two tubular members of an automobile space frame can be joined together end to end by providing the tubular members with specifically manufactured end portions which cooperate together to define a series of channels for receiving adhesive and also two apertures through which adhesive can be injected in order to adhere the two components together.

EP-A-0523831 shows how a motor car structure can be built up from flat panels joined together, each panel comprising two mutually parallel spaced apart structural skins braced with respect to each other by a core of expanded material united to both skins. Each joint between the two panels comprises a series of integral projections formed on a first panel formed by cutting the first panel to a required shape and also recesses in the second panel which correspond to the projections, the projections being inserted into and bonded in the recesses by means of an adhesive.

DE-A-4202391 shows how two automobile panels can be connected together by a joint with an L-shaped cross section, which acts as an interconnecting member. The L-shaped joint has two channels, one for each of the panels to which it is joined. Each channel is formed with a cross section which defines a groove for receiving adhesive in order that a panel inserted into the channel can be adhered to the channel by adhesive in the groove.

DE-A-4124627 shows how a body panel for a vehicle can be provided with a corrugated edge section so that the panel can be joined to another panel by inserting the corrugated edge into a channel provided at the edge of the second panel. The corrugated edge serves to locate the first panel in the channel at the edge of the second panel whilst the adhesive is setting and also serves to define a gap for the adhesive.

The present invention in a first aspect provides a method of manufacture of a structure which comprises a plurality of structural members bonded together, the method comprising the steps of extruding a structural member with a chosen cross-section, and joining extruded structural member to another structural member by bonding with an adhesive, wherein when the extruded structural member is bonded to the structural member the depth of the adhesive between the two structural members varies with variations in the cross-section of the extruded structural member, characterised in that the cross-section of the extruded structural member is chosen so as to enhance the performance of the adhesive bond between the structural members.

In a second aspect the present invention provides a structural member for use in the method of manufacture described above which is a hollow, elongate extrusion of aluminium or an alloy of aluminium and which has a plurality of longitudinally extending spaced apart ribs for defining a gap between the structural member and a further structural member bonded thereto.

In a third aspect the present invention provides a method of manufacture of a structure wherein first and second structural members are bonded together with adhesive, characterised in that the first structural member is provided on a first surface with a plurality of spaced apart exterior ribs which abut an adjacent surface of the second structural member when the structural members are bonded together and which define between the first surface of the first structural member and the adjacent surface of the second structural member a gap for receiving adhesive, whereby the ribs define a chosen depth of adhesive between the first and second structural members in order to optimise the bond between the first and second structural members.

In a fourth aspect the present invention provides a structural member for use in the above described method which is an extrusion and which has a plurality of longitudinally extending exterior ribs provided on a first surface to define between the first surface and an adjacent surface of a second structural member bonded to the structural member a gap for receiving adhesive, whereby the ribs can define a chosen depth of adhesive.

In a further aspect of the present invention there is provided a method of manufacture of a structure which comprises a tubular elongate structural member, the method comprising the steps of forming the tubular elongate structural member with a chosen cross-section, and joining the tubular elongate structural member to a second structural member by bonding with an adhesive, wherein when the tubular elongate structural member is bonded to the second structural member the depth of the adhesive between facing surfaces of the tubular elongate structural member and the second structural member varies with variations in the cross-section of the tubular elongate structural member, characterised in that the cross-section of the tubular elongate structural member is chosen to enhance the performance of the adhesive bond between the tubular elongate structural member and the second structural member.

Bonding of structural members with adhesive and optionally with mechanical fasteners in addition to adhesive, is advantageous over welding and over the use of mechanical fasteners alone. The resulting bond does not suffer from heat distortion and does not suffer from reduction in material properties occasioned by the heat of welding. The resulting joint is also stiffer that a joint which would result from purely mechanical fastening (e.g. with nuts and bolts). Furthermore, the bonding process enables the use of hollow tubular members of a wall thickness thinner than that which would be necessary if welding is used as a joining method (welding causes some depletion of metal and consequent weakening of the structural members). However, the strength, efficiency and durability of a bonded joint depends on the thickness of adhesive between the two structural elements joined. Therefore it is very important to control the thickness of the adhesive layer between the two structural members. The present invention solves this problem in all of its aspects by shaping the members to be joined in a fashion that the depth of adhesive is a planned and controlled depth. The extrusion of material to form a structural member with a chosen cross-section is a very efficient way of forming the structural member, particularly if the member is made of aluminium or an alloy of aluminium. The required cross-section is obtained in one operation and the formed member requires little or no further machining.

Preferred embodiments of the present invention will now be described with reference to the accompanying drawings in which.

Figure 1:
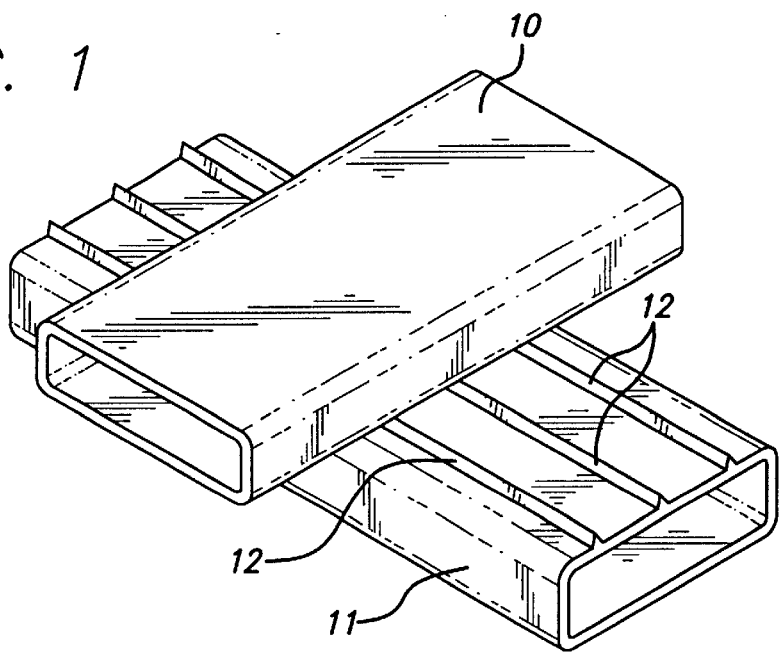
FIG. 1 is a drawing illustrating a typical joint in a structure according to the present invention.

In FIG. 1 a first hollow extruded aluminium structural member 10 is joined to a second hollow extruded aluminium structural member 11 by bonding. This figure shows a joint between two structural members in a space frame for an automobile. It will be understood that the total space frame will comprise a number of different aluminium structural members, all joined together to form the required space frame shape. FIG. 1 shows only a joint between two such extruded hollow aluminium structural members, but it should be understood that the figure is representative of how the extruded hollow aluminium structural members are joined throughout the space frame.

The hollow extruded aluminium structural member 10 is formed with a constant cross-section of a generally rectangular form. Four planar regions are provided on the exterior of the structural member 10, each planar surface being orthogonal to its two nearest planar surfaces and joined thereto by curved regions of the structural member 10 which define the four corners of a cross-section through the structural member. The structural member 10 is formed by an extrusion process, aluminium being particularly suited to an extrusion type of manufacturing. Manufacturing by extrusion is a particularly useful and cost effective method for low volume manufacture of space frames.

Figure 3:
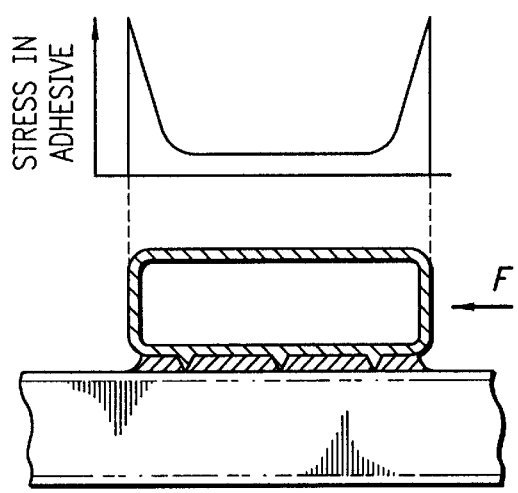
FIG. 3 is a figure which illustrates the distribution of stress through a prior art joint.

In the past, space frame manufacturers have bonded a hollow extruded aluminium structural member such as member 10 directly to a member of identical cross-section, with two planar surfaces being brought together within a layer of adhesive between the surfaces. This is illustrated in FIG. 3. The disadvantage of doing this arises from the fact that bond thickness in a joint is a very important factor in determining the strength efficiency and durability of the bonded joint. When two planar surfaces are brought together, it is difficult to control the bond thickness between the surfaces and therefore the resulting joints are very variable in their strength efficiency and durability. The present invention overcomes this problem by manufacturing the second structural element 11 with a specially chosen cross-section.

The structural member 11 is manufactured in the preferred embodiment from aluminium using an extrusion process. The structural element is provided with small ribs 12 on one exterior surface of a planar region of the structural member. Since the structural member is manufactured by extrusion, it is a very easy, low cost process to provide the small ribs 12. Providing the small ribs 12 by any other manufacturing process would be difficult to do cost effectively. However, extrusion is a very good process for providing a member with a consistent cross-section manufactured to high tolerances which does not require any general further machining in order to bring it into a form suitable for use. Also, extruded sections tend to have a very good surface finish, and generally do not require further operations in order to bring the surface finish to an acceptable quality.

Figure 2:
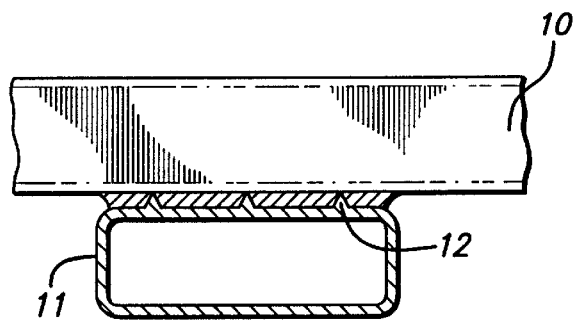
FIG. 2 is a cross-section through the joint illustrated in FIG. 1.

As can be seen clearly in FIGS. 1 and 2, the extruded aluminium structural member 11 is provided with a plurality of parallel ribs 12 which extend along the length of the elongate structural member 11. When the elongate hollow aluminium extruded structural member 11 is to be bonded to the structural member 10 then the surface of the member 11 is coated with adhesive in a desired region and then the two structural members 10 and 11 are clamped tightly together by an assembly fixture while the adhesive sets. Alternatively, it may be desired that the formed joint is reinforced by means of mechanical fastenings, such as nuts and bolts, rivets or screws. It is particularly preferred that EJOTS screws are used since these are easy to use and a high tear out force must be applied to loosen them. In this case, the structural members 10 and 11 are bolted or screwed or otherwise connected to each other whilst the bonding adhesive remains fluid.

When the structural members 10 and 11 are mechanically clamped together, the top of the ribs 12 on the structural member 11 come into direct abutment with the adjacent planar surface of the structural member 10. Thus, this ribs 12 define a bond thickness over almost the entire area of the joint. A bond thickness of 0.2 mm is the optimal bond thickness for an epoxy adhesive, obviously, the ribs could be formed with different heights for different types of adhesive in order always provide the optimal bond thickness. The longitudinal ribs 12 allow adhesive to flow along channels between the ribs 12 along the structural member 11 so that an excess of adhesive can be applied to the surface of the structural member 11 before the two structural members 10 and 11 are joined, with the excess adhesive flowing along the channels when the structural member 10 is brought into abutment with the top of the ribs 12. Alternatively, it may be preferred to bring the structural member 10 into abutment with the ribs 12 first and then use the defined channels as channels into which bonding material can be injected.

Since the ribs 12 extend all along the elongate structural member 11 the member 10 can be bonded to the member 11 at any point along its length.

As mentioned above, FIG. 3 shows a typical bonded joint according to the prior art. In the original bonded joint, the stress distribution in the adhesive is uneven as illustrated by the graph of stress distribution shown in FIG. 3 when a tangential force F is applied to the member 10 in the direction indicated by the arrow in FIG. 3. The stress in the adhesive is very much greater at the edges of the bond areas that in the rest of the area; this makes the bond susceptible to peel. This is clearly unsatisfactory as optimum strength of a bond is achieved only if the adhesive is stressed to the same level over the joint. When the prior art joint is highly loaded then the adhesive begins cracking at the lines of highest stress, whilst the stress in the rest of the adhesive is much lower. The cracks can initiate failure of the joint at loads significantly below the optimum load which the joint should be capable of carrying.

Figure 4:
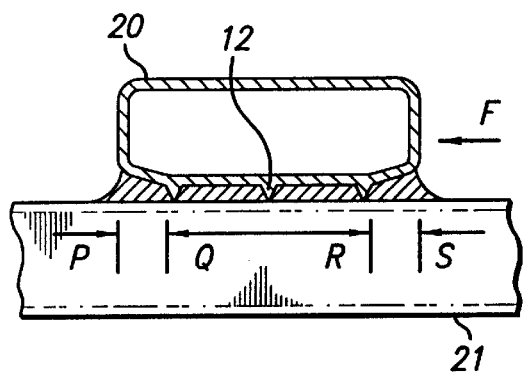
FIG. 4 is an illustration of a second type of joint in a structure according to the present invention.

The present invention deals with the problem of uneven stress loading by providing one of the structural members to be joined with a cross-section which acts to define a varying adhesive depth across the joint, the varying adhesive depth acting to optimise the strength of the joint. FIG. 4 shows this by showing how two structural members 20 and 21 can together define a varying bond thickness. In FIG. 4 three different distinct regions can be seen in the joint. Area Q-R has the optimal small thickness of adhesive (e.g. 0.2 mm for an epoxy adhesive). The thickness of adhesive in this region is preferably controlled as described above, by the use of ribs (although these are not strictly necessary. Areas P-Q and R-S are areas of increasing thickness. The profile of the structural member 20 is defined in order to provide the variation of bond thickness required, the cross-section of the structural member 20 being defined simply and cheaply by an extrusion process. The profile of the structural member 20 in the areas P-Q and R-S may be straight, convex or concave according to the requirements of the particular adhesive used in the bonds.

By defining thicker areas of adhesive at the edges of the joint the performance of the joint is improved. This arises since the areas of greater thickness towards the edges of the bond area are less stiff than the area of bond in the region Q-R and therefore when the joint is loaded tangentially by a force F in the direction shown in FIG. 4 the strain imparted on the edges of the bond will be determined by the overall stiffness of the joint in reaction to the imposed load, since the less stiff edge regions will deform to allow strain in the central portion of the joint which thus shares the loading. Thus, an imposed load will result in a lower level of stress in the adhesive at the edges of the bonded joint and the performance of the joint as a whole is improved.

A joint between the two structural members 20 and 21 is formed by coating the structural member 21 with a layer of adhesive and then bringing the structural member 20 into engagement with the adhesive. The structural members 20 and 21 could be mechanically clamped together (either by external clamps or by mechanical fasteners if the joint is to be both mechanically fastened and bonded).

The curved edge profile shown in FIG. 4 (or indeed any curved edge profile) would be avoided in the prior art since square sharp edges such as shown in FIG. 4 are preferred for welding purposes. It is difficult to weld a component with curved edges since the welding process would lead to inclusion in the weld. For this reason square edged sections have been preferred in the prior art. In contrast the present invention teaches the skilled man to design the edge Eprofiles to match the stress distribution across the join.

In the above illustrated embodiments of the invention it will be appreciated that the cross-sections required are obtained by extrusion of aluminium to form a member with a required cross-section. As mentioned above, extrusion makes cost effective forming of members with particular cross-sections viable, since if an extruded section will have close tolerances and will require little in the way of material treatment after forming.

Whilst the invention as described in preferred embodiments is applied to tubular elongate members for use in a space frame of an automobile, it should be appreciated that the elongate structural members can be used to form other structures. Also, the invention has a wider scope in that it can also be applied to other sorts of structural members such as panels, which can be provided with surface ribs or with a chosen cross-section in order provide beneficial bonding effects. The invention is less preferably applied to panels, since panels are difficult to extrude and the invention is ideally suited to the extrusion process. The invention is, however, not limited in its broadest scope to extruded structural members, since, for instance, it is possible to make structural members which ribs defining bond thickness by other less preferable methods, e.g. rolling or casting.

The present invention becomes particularly important when high modulus (high stiffness) adhesives are used since the detrimental effects of having a wrong thickness or a disadvantageous stress distribution are enhanced.

It will be appreciated that many types of adhesive could be used in the invention, but the preferred types are acrylic adhesives or epoxy adhesives.

What is claimed is:

1. A method of constructing a bonded joint in a structure, comprising:

forming a plurality of ribs in a surface of a first structural member to be bonded to a second structural member, said ribs in said first structural member extending along a portion of said first structural member in an area to be bonded to a corresponding area of said second structural member, said ribs projecting a uniform height in the range 0.15 mm to 0.25 mm above a first surface of said first structural member in the area to be bonded;

forming in said first structural member a second surface between said ribs and the periphery of said first structural member in an area to be bonded to said second structural member defining an area near said periphery having a predetermined distance from the proximal ends of said ribs greater than the height of said ribs;

applying sufficient uncured adhesive to the area between the first and second structural members to fill the area between the ribs when the ribs are in contact with the second structural member and to extend said adhesive to the edge of the first structural member to thereby cause a first predetermined uniform thickness of adhesive between the first and second structural members in the area of the ribs and a second predetermined thickness of adhesive in an area at the periphery of the first structural member in the area to be bonded, said second thickness of adhesive having a greatest thickness at least twice said first thickness of adhesive and said second thickness of adhesive being chosen to improve resistance of the adhesive to peeling of the periphery of the area to be bonded;

fastening said first structural member to said second structural member by a plurality of fasteners after application of said adhesive to hold said structural members in alignment during curing of said adhesive; and curing said adhesive.

2. The method of claim 1, wherein said adhesive is an epoxy adhesive.

3. The method of claim 1, wherein said fasteners are threaded fasteners positioned near the periphery of the bonded area.

4. The method of claim 1, wherein said fasteners are rivets positioned near the periphery of the bonded area.

5. The method of claim 1, further comprising: forming said first and second structural members form an aluminum alloy by a process of extrusion.

6. The method of claim 5, wherein said ribs in said first structure member are formed in said extrusion along the entire length of said first structural member.

7. The method of claim 1, wherein the location of the fasteners is near the periphery of the area to be bonded, to thereby improve resistance of the joint in the structure to peel stress.

8. A method of fabricating a bonded joint in a structure of a vehicle, comprising:

forming a first structural member to include a plurality of projections from a surface to be bonded, said projections having a uniform height in the range 0.15 mm to 0.25 mm;

forming a second structural member to include a mating surface to be bonded;

configuring the areas of said surface to be bonded in said first structural member and said second structural member so that when said projections in said first structural member come in contact with said mating surface of said second structural member, a gap is formed between said structural members which is of a first predetermined constant height in the center of the mating surface and a second predetermined height in the peripheral area of said mating surface, said second predetermined height having a maximum at least twice the first predetermined height;

filling the area between the structural members in the mating area to be bonded with uncured adhesive in an amount in excess of that required to fill the area when the projections in the first structural member touch the mating surface of the second structural member;

attaching said first structural member to said second structural member with a plurality of fasteners to hold said structural members in contact and thereby causing a first predetermined uniform thickness of adhesive between the first and second structural members in the area of the ribs and a second thickness of adhesive in an area at the periphery of the first structural member in the area to be bonded, said second thickness having a greatest thickness at least twice said first thickness of adhesive and said second thickness being chosen to improve resistance of the adhesive to peeling of the periphery of the area to be bonded; and curing said adhesive to form a completed portion of said structure.

9. The method of claim 8, wherein said adhesive is an epoxy adhesive.

10. The method of claim 8, wherein said fasteners are threaded fasteners positioned near the periphery of the bonded area.

11. The method of claim 8, wherein said fasteners are rivets positioned near the periphery of the bonded area.

12. The method of claim 8, further comprising: forming said first and second structural members from an aluminum alloy by a process of extrusion.

13. The method of claim 12, wherein said protrusions in said first structural members are ribs formed in said extrusion along the entire length of said first structural member.

14. The method of claim 8, wherein the location of the fasteners is near the periphery of the area to be attached, to thereby improve resistance of the structure to peel stress.

15. A method of constructing a portion of a structure, comprising the steps of:

forming a first structural member such that an area on the structural member to be attached contains a plurality of projections of a predetermined length in a central portion of the area to be attached, the tips of said projections defining a first plane and the bases of said projections defining a second plane, said first and second planes being spaced by a distance in the range of 0.15 mm to 0.25 mm;

forming a second structural member such that an area to be attached to the first structural member contains an area defining a third planar area corresponding to the position representing a mating area for the projections in the first structural member;

forming in the first structural member an area around the periphery of said projections and within the area to be attached which is a greater distance from the first planar area than the second planar area;

applying an amount of uncured adhesive greater than an amount necessary to fill the gap between the structural members when they are placed together with the distal tips of the projection on the first member touching the area to be attached on the second structural member;

placing the first and second structural members in contact in the area to be attached by placing the distal tips of said projections in contact with said third planar area of said second structural member in the area to be attached and thereby forming a first predetermined thickness of adhesive between the first and second structural members in the area of the projections and a second predetermined thickness of adhesive in an area at the periphery of the first structural member in the area to be bonded, said second thickness of adhesive having a greatest thickness at least twice said first thickness of adhesive and said second thickness of adhesive being chosen to improve resistance of the adhesive to peeling of the periphery of the area to be bonded; and fastening said first structural member and said second structural member together in the area to be bonded while curing said adhesive.

16. The method of claim 15, further comprising the step of fastening said first and second structural members together with threaded fasteners.

17. The method of claim 15, further comprising the step of fastening said first and second structural members together with rivets.

18. The method of claim 15, wherein said adhesive is an epoxy adhesive.

19. The method of claim 15, wherein said projections are ribs formed in said first structural member.

20. The method of claim 15 wherein said projections are tapered, said projections being of a smaller thickness at their distal end than at their proximal end.

21. The method of claim 19 wherein said first structural member is formed by extrusion.

22. The method of claim 19, wherein said ribs are formed over the entire length of said structural member.

23. The method of claim 21, wherein said structural members are formed of an aluminum alloy.

24. The method of claim 22, wherein said structural members are formed by a process of extrusion.

* * * * *